Sept. 13, 1932.　　A. C. McHUGH ET AL　　1,877,249

RECORDING DRIFT INDICATOR

Filed Feb. 15, 1929　　2 Sheets-Sheet 1

INVENTORS
Arthur C. McHugh
Harry J. Rasneor

Sept. 13, 1932.  A. C. McHUGH ET AL  1,877,249

RECORDING DRIFT INDICATOR

Filed Feb. 15, 1929  2 Sheets-Sheet 2

INVENTORS.
Arthur C. McHugh
Harry F. Rasner.

Patented Sept. 13, 1932

1,877,249

UNITED STATES PATENT OFFICE

ARTHUR C. McHUGH, OF NORWALK, AND HARRY F. RASNEOR, OF LONG BEACH, CALIFORNIA

RECORDING DRIFT INDICATOR

Application filed February 15, 1929. Serial No. 340,303.

Our invention relates to a device which may be lowered into the well bore, such as an oil well, for the purpose of determining and recording what, if any, departure the bore has made from the perpendicular.

The objects of our invention are: First, to provide an apparatus which will indicate and make a continuous record of the vertical inclination of a bore hole, upon a direct reading record tape; second, which will, coincidentally therewith indicate the direction of any departure the hole may make from the perpendicular. Other objects will appear hereinafter.

Our apparatus depends, for its action, upon gravity and is generally described as follows: Within a protective casing a cylindrical cage is provided, free to revolve upon a vertical axis. One side of this cage is weighted so that if its axis is inclined from the perpendicular the weighted side will turn the cage relative to the direction of the inclination. A pen carried on the lower portion of the cage records its movement upon a recording tape moved by clockwork as the device is lowered into the well, and in this manner the direction of any perceptible inclination at any given time is recorded. Within the cage a horizontally pinioned plumb-bob controls the movement of a recording pen. The axis of the supporting pinion is at right angles to the position of the weighted side of the cage. As the cage turns, the plumb-bob moves its attached pen, which marks these movements upon a recording tape operated by clockwork; thus the degree of inclination is recorded as the device is lowered into the well bore.

The specific construction of the present embodiment of our apparatus is described by reference to the accompanying drawings in which,—

Similar numerals refer to similar parts throughout the several views.

Figure 1:
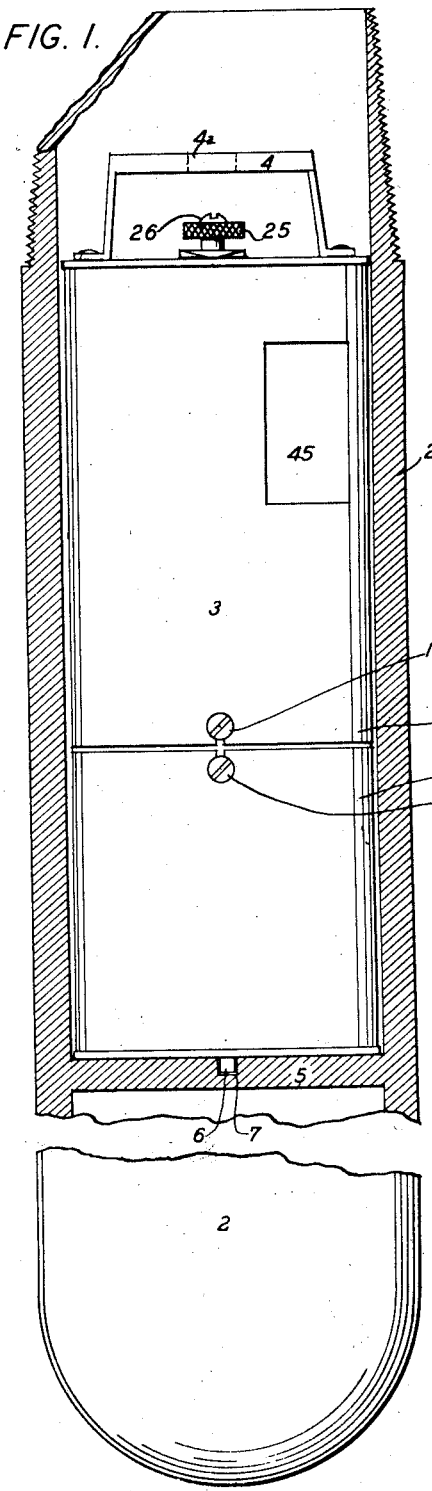
Figure 1 is a general elevational view of the apparatus in place in a sinker bar, only the upper and lower portions of sinker bar being shown.
Figure 2:
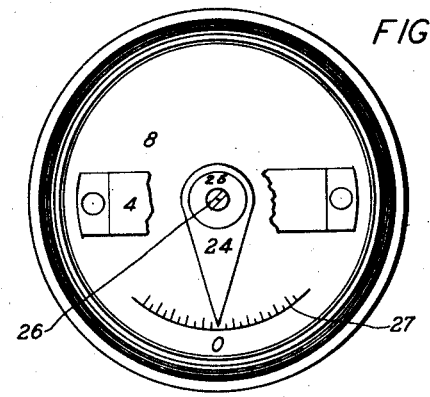
Figure 2 is a plan view of our device, a portion of the handle being broken away to show the setting knob and indicator.
Figure 3:
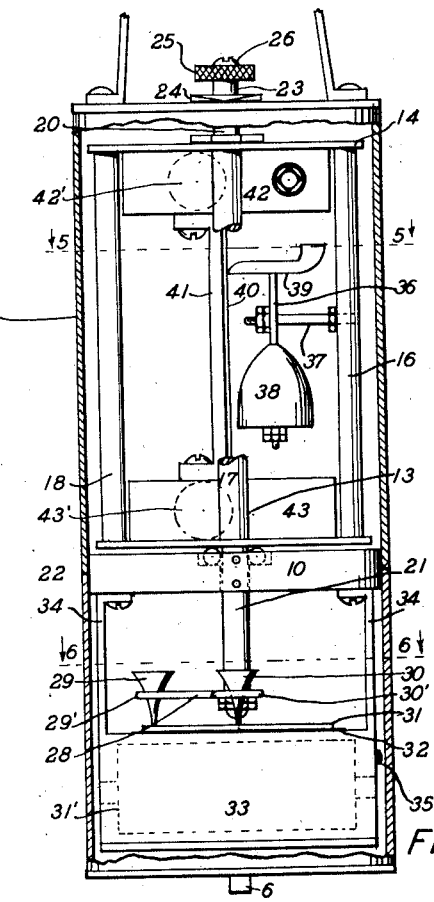
Figure 3 is an elevational view with a portion of the case and one pillar broken away to show the operating parts.

Referring particularly to Figures 1, 2 and 3; a sinker bar 2, forms an outside protective case within which the cylindrical supporting case 3 may be placed. A handle 4 is provided so that the case may be easily placed within, and removed from the case 2. The case 3 rests on the diaphragm 5 which forms a support for it in the upper end of the sinker bar 2, and has the cross slot 6 into which the strip 7 on the case 3 fits, thereby preventing any turning movement between 2 and 3. The sinker bar is long enough to conform to the general direction of the well bore into which it is to be lowered, twenty feet usually being sufficient. The lower end of 2 is smoothly closed off and the upper end is provided with a threaded joint adapted to join onto a standard drill pipe.

The cylindrical case 3 is composed of two removable parts. The upper part or head 8 and the lower part 9. These fit snugly over a disc shaped support 10 being held in place and in uniform position by lock-screws 11 and 12.

Figure 5:
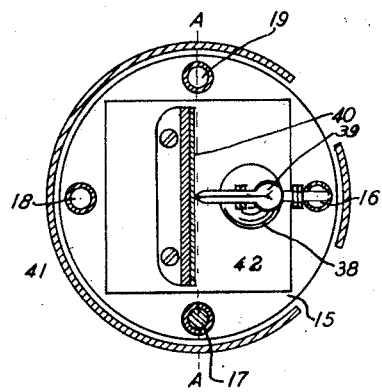
Figure 5 is a horizontal section on line 5—5 Figure 3.

Turning within the upper portion of this case 8, is a cage 13, composed of two disc-shaped ends 14 and 15 joined by supporting pillars 16, 17, 18 and 19 (see also Figure 5). Pillars 16, 18 and 19 are light hollow brass or aluminum tubes, while pillar 17 is filled with lead, mercury, or otherwise suitably heavily weighted. This cage is supported by shafts 20 and 21 attached to the centers of the end discs 14 and 15 respectively. The shaft 20 is journaled in the center of the top of the head piece 8, turning therein in a ball or other anti-friction bearing, while shaft 21 turns in a similar bearing 22 in the support 10 which serves also as a vertical thrust bearing to support the weight of the cage. All parts of the cage are balanced so that the axial or rotational center of gravity of the cage on its bearings coincides with the center of weighted pillar 17.

A shoulder is turned on the upper part of shaft 20 and the upper portion thereof squared to receive the sleeve 23, which carries on its lower end the pointer 24, and on its upper end a setting knob 25. These parts may be removed from the shaft 20, when it is desired to remove the upper head 8 for the purpose of adjusting or setting the tape or clock mechanism by removing screw 26. Hole 4A is provided for this purpose.

The pointer 24 reads on a scale 27 on the top of head 8. The position of this pointer coincides with the center of the weighted pillar 17, and thus, by reference to the scale 27, the angular position of the weighted side of the cage, with reference to the case 3, and, in turn, any marker point on the circumference of the sinker bar 2, may be determined.

Figure 6:
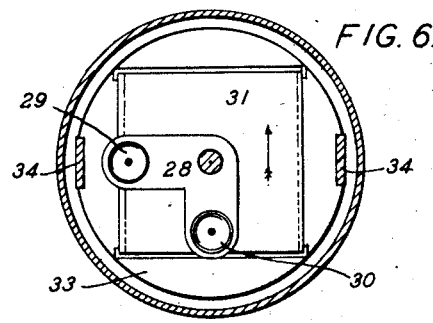
Figure 6 is a horizontal section on line 6—6 Figure 3.

The shaft 21 extends down through 10 and carries on its lower end the L shaped pen support 28 to which are affixed the conical recording pens 29 and 30. (See Figure 6.) Pen 30 on arm 30' of support 28 is set to be in line with the center of weighted pillar 17 and therefore coordinate with pointer 24. Pen 29 is usually filled with green ink while pen 30 is filled with red ink.

These pens bear on the strip 31 which is moved in the direction of the arrow across the supporting table 32, at a uniform predetermined rate by the conventional clock work mechanism 33. This table 32 and the clock work 33 is supported by bars 34 attached to support 10. The clock work is wound by a suitable key applied to the squared shaft 35. The position of the rollers operating the tape is indicated by the dotted lines marked 31'.

Within the cage the lever or pendulum rod 36 is supported on the end of shaft 37 on which it freely turns. At its lower end is attached the pendulum or plumb-bob 38, and at its upper end the V trough pen 39. It is to be noted that the axis of the shaft 37 is at right angles, on a horizontal plane, to a line A—A, drawn through the vertical axis of the cage 13 and the axis of pillar 17. Thus, it is at right angles to the axial center of gravity of the cage. It is also perpendicular to the plane of the paper of the recording strip 40 against which the tip of the pen 39 bears. This recording paper strip moves vertically on the supporting table 41 in the direction of the arrow tracing a line thereon, and is moved by clockwork mechanism 42, being received on indicated roller 42' and unrolled from roller 43' in the case 43. This clockwork is also of conventional design, moving the tape at a predetermined rate. The recording tapes or strips are also conventional.

The operation and use of our device is as follows:—

Figures 7, 8:
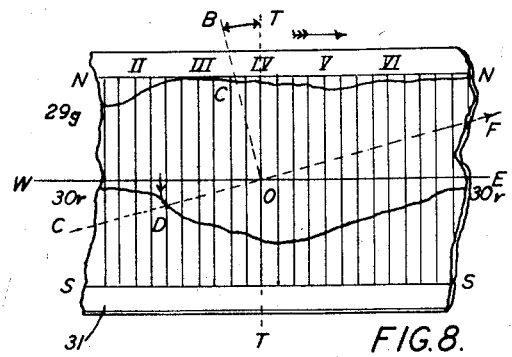
Figure 7 is a portion of the inclination-recording tape.
Figure 8 is a portion of the directional recording tape.

The recording strips are placed in operative position on their respective tables. The pens are filled; their positions noted on the tapes, and, the clock mechanisms started. The position of pens 29 and 30 on the isochronal lines II, III, IV, etc. on strip 31 may be observed while the lower portion of the case 9 is removed. This position is noted with reference to any arbitrary numbering of these lines such as indicated in Figure 8, and is taken when pen 30 is running directly on line W—E.

The position of the pen 39 on its strip 40 is noted through observation holes 45, with reference to isochronal lines numbered II', III', IV', etc. both these readings are logged with reference to the time shown on a master clock at the well head in the derrick. The isochronal lines are usually marked so as to be 15 minutes apart, and the numerals on each tape coordinated for the simplification of readings.

It is to be noted that the movements of the inclination pen 39 on tape 40 may be read directly on lines V which are parallel to zero line P—P (Figure 7) and to each other, and intersect equidistant spaces on the arc of the isochronal lines I', II', etc.

The above preparation being made the lower case 9 is placed in position, and the entire device 3 placed within the bar 2, which is then attached to a drill pipe and lowered into the well, section at a time. The depth is logged with reference to the master clock so that the time when each section was lowered, and in place is noted and can be checked with the tapes 31 and 40.

Before the case is screwed onto the drill pipe, the pointer 24 is set in the bar 2 on the 0 mark of scale 27 so that pen 30 is on the line W—E. The true direction of the pointer in this position is noted on a compass or by reference to some well known mapped object near the well. As the sections of drill pipe are lowered each one is added without turning the lower one, and thus the position of the sinker bar and supporting case relative to the reference point thus kept constant.

If, at any footage, the well departs from the perpendicular the sinker bar 2 containing the above described apparatus will assume a corresponding direction. This departure from the perpendicular will cause the cage 13 to turn so as to bring pillar 17 to the lower side; that is, 17 will take a position on the side away from the direction of the drift of the hole. The pens 29 and 30 following this turning movement will trace wavy lines 29g and 30r on tape 31. The degree of this turn can be determined by taking the position of these pens at any given time as follows: A right angle trammel having its points congruent with the axis of the cage 13, and the centers of pens 29 and 30 respectively, is placed upon the tape 31, with the trammel point at the right angle on the center line W—E. With this trammel point on the line W—E the other two points are made to rest on lines 29g and 30r respectively, (Figure 8). One leg of the trammel will then coincide with line OB and its trammel will touch the line 29g, which has been traced by pen 29, at point C. The other leg will touch the line 30r at point D. Point O will then indicate the time line IV, corresponding to the time when the axis of the case 13 was over that particular point. Since the pen 30 was originally set on line W—E and pen 29 on line N—N it is obvious that the hole has departed from the perpendicular and taken a slant which would tend to throw the axis of column 17 in the direction indicated by the arrow and directly over the line CO. The drift is then in the direction of the line OF.

To those familiar with the art, the use of two pens set at right angles using distinctive colored ink will be obvious. If only one pen was used the position of the pen as it approached the side lines N—N and S—S would be difficult to determine, as also would the value of angle BOT. With two pens the position of one of them, may always be determined at a maximum angle with reference to the direction of the motion of the tape.

Figure 4:
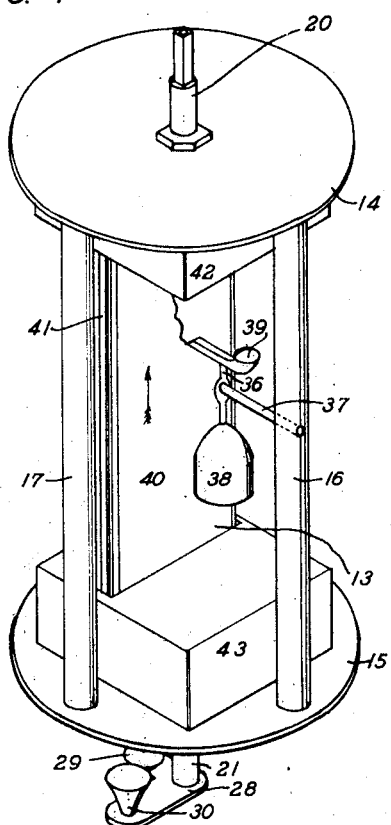
Figure 4 is a perspective view of the cage.

To determine the degree of slant or drift reference is had to the position of pen 39 on tape 40 at the same instant. Since the time lines, II, III, IV etc. on 40 correspond to those on 31 it is easy to determine the isochronal line on which pen 39 rested when the axis of 13 was on point O. Had the hole remained perpendicular the pen 39 would have traced the straight line in the center of 40 marked P—P. When the cage turned, however, due to the drift which caused 17 to move to the position indicated by point D, the axis of the pinion support for the lever 36 was placed at right angles to the line CO. The weight 38 then moved toward the low side of the hole (to the left in Figure 4) causing the pen 39 to move toward the direction of the slant (to the right) and hence the pen tracing the line R—R would be at point T' at the time indicated by the isochrome IV'. (Figure 7.)

By checking these readings against the footage as indicated on the logs as the device is lowered the direction and degree of slant of the well bore may be determined at any point, and from a series of these points a graph of the direction and degree of the drift of the hole may easily be plotted.

Having now fully described our apparatus and device and its use we realize that the embodiment as herein disclosed is susceptible of many changes and refinements which would nevertheless, remain within the general intendments and spirit of our invention. We wish, therefore, to be limited only to the following claims.

We claim:—

1. In a device for indicating and recording the vertical inclination of well bores, in combination, a cage adapted to conform to the inclination of the well bore, a progressively movable recording tape having an exposed portion which extends in a generally horizontal direction with respect to the axis of said cage, said cage being weighted on one side and mounted upon a vertical axis to permit rotation thereof under the influence of the weighted side thereof, a horizontally swinging device having a pivotal mounting in substantially the longitudinal axis of said cage, said device having two pen points mounted in fixed relation to each other and circumferentially spaced apart, said pen points being positioned to engage the exposed portion of said record tape and swinging under the action of gravity to indicate variations in the direction of inclination of said cage.

2. In a device for indicating and recording the vertical inclination of well bores, in combination, a cage adapted to conform to the inclination of the well bore, a progressively movable recording tape having an exposed portion which extends in a generally horizontal direction with respect to the axis of said cage, said cage being weighted on one side and mounted upon a vertical axis to permit rotation thereof under the influence of the weighted side thereof, a horizontally swinging device having a pivotal mounting in substantially the longitudinal axis of said cage, said device having two pen points mounted in fixed relation to each other and circumferentially spaced apart, at an angle of substantially ninety degrees with relation to each other and to the pivotal mounting of said device upon which they are mounted, said pen points being positioned to engage the exposed portion of said record tape and to indicate thereon variations in the direction of inclination of said cage.

ARTHUR C. McHUGH.
HARRY F. RASNEOR.